US007974242B2

(12) United States Patent
Yang et al.

(10) Patent No.: US 7,974,242 B2
(45) Date of Patent: Jul. 5, 2011

(54) DEVICE, SYSTEM, AND METHOD OF CHANNEL QUALITY INDICATION

(75) Inventors: Rongzhen Yang, Shanghai (CN); Xiaoliang Luo, Beijing (CN); Liang Jiang, Shanghai (CN); Hujun Yin, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 11/923,781

(22) Filed: Oct. 25, 2007

(65) Prior Publication Data
US 2009/0111475 A1    Apr. 30, 2009

(51) Int. Cl.
*H04W 4/00* (2009.01)
(52) U.S. Cl. ........ 370/332; 370/229; 370/235; 370/236; 370/329
(58) Field of Classification Search .................. 370/229, 370/230.1, 235, 236, 241, 242, 252, 310.2, 370/328, 332, 341
See application file for complete search history.

(56) References Cited

U.S. PATENT DOCUMENTS

| | | | |
|---|---|---|---|
| 7,539,207 B2 * | 5/2009 | Frederiksen et al. | 370/465 |
| 7,729,432 B2 * | 6/2010 | Khan et al. | 375/260 |
| 2005/0111406 A1 * | 5/2005 | Pasanen et al. | 370/329 |
| 2005/0207367 A1 * | 9/2005 | Onggosanusi et al. | 370/315 |
| 2007/0026810 A1 * | 2/2007 | Love et al. | 455/67.11 |
| 2008/0080469 A1 * | 4/2008 | Kolding et al. | 370/342 |
| 2008/0095185 A1 * | 4/2008 | DiGirolamo et al. | 370/464 |
| 2008/0101407 A1 * | 5/2008 | Khan et al. | 370/468 |
| 2008/0132281 A1 * | 6/2008 | Kim et al. | 455/562.1 |
| 2008/0207135 A1 * | 8/2008 | Varadarajan et al. | 455/69 |
| 2009/0010319 A1 * | 1/2009 | Sun et al. | 375/224 |
| 2009/0109909 A1 * | 4/2009 | Onggosanusi et al. | 370/329 |
| 2009/0196190 A1 * | 8/2009 | Li et al. | 370/252 |
| 2009/0209261 A1 * | 8/2009 | Kuri et al. | 455/450 |
| 2009/0268624 A1 * | 10/2009 | Imamura et al. | 370/252 |
| 2009/0279446 A1 * | 11/2009 | Yoshii et al. | 370/252 |
| 2010/0110982 A1 * | 5/2010 | Roh et al. | 370/328 |

OTHER PUBLICATIONS

Roh et al., U.S. Appl. No. 60/894,870, Mar. 14, 2007, p. 26.*
3GPP TSG RAN1#43, Seoul, Korea, Nov. 7-Nov. 11, 2005, R1-051334, "CQI Feedback Scheme for EUTRA", downloaded from http://www.3gpp.org/ftp/, pp. 1-9.
3GPP TSG RAN1#44, Helsinki, Finland, Jan. 23-25, 2006, R1-060018, "Performance Evaluation of EUTRA Downlink CQI Feedback Schemes", downloaded from http://www.3gpp.org/ftp/, pp. 1-7.
TSG-RAN WG1 LTE Ad Hoc Meeting, Helsinki, Finland, Jan. 23-25, 2006, R1-060094, "Signaling of E-UTRA Scheduling Information", downloaded from http://www.3gpp.org/ftp/, pp. 1-2.
TSG-RAN WG1 WG1 LTE Ad Hoc Meeting, Helsinki, Finland, Jan. 23-25, 2006, R1-060155, "Scheduling and Multiplexing of CQI and ACK/NACK Feedback for Single Carrier FDMA in Evolved UTRA Uplink", downloaded from http://www.3gpp.org/ftp/, pp. 1-8.

(Continued)

*Primary Examiner* — Kwang B Yao
*Assistant Examiner* — Nguyen Ngo
(74) *Attorney, Agent, or Firm* — Shiloh et al.

(57) ABSTRACT

Device, system, and method of channel quality indication. In some demonstrative embodiments a method may include, for example, calculating a plurality of channel-quality-indicator values corresponding to a plurality of sub-channels associated with a mobile communication device; and transmitting a channel-quality-indicator message from the mobile communication device to a base station, the channel-quality-indicator message including only first and second channel-quality-indicator values of the plurality of channel-quality-indicator values corresponding to first and second sub-channels of the plurality of sub-channels. Other embodiments are described and claimed.

15 Claims, 4 Drawing Sheets

OTHER PUBLICATIONS

TSG RAN WG1 ad hoc meeting on LTE, Helsinki, Jan. 23-25, 2006, R1-060228, "Sensitivity of DL/UL Performance to CQI-Compression with Text Proposal", downloaded from http://www.3gpp.org/ftp/, pp. 1-7.

3GPP TSG-RAN WG1 Meeting #44, Denver, USA, Feb. 13-17, 2006, R1-060325 (Original R1-060050), "CQI-Based Transmission Power Control for L1/L2 Control Channel in E-Utra Uplink", downloaded from http://www.3gpp.org/ftpl, pp. 1-2.

3GPP TSG-RAn WG1 Meeting #48, St. Louis, Missouri, USA, Feb. 12-16, 2007, R1-071229, "Definition of MIMO operation on Hs-PDSCH, preferred precoding and CQI reporting procedures, modified CQI tables", downloaded from http://www.3gpp.org/ftp/, pp. 1-16.

* cited by examiner

DEVICE, SYSTEM, AND METHOD OF CHANNEL QUALITY INDICATION

BACKGROUND

A Channel-Quality-Indication (CQI) feedback mechanism may be implemented to provide a Base Station (BS) with information regarding a condition of communication sub-channels used by one or more mobile communication devices. According to the CQI feedback mechanism, the BS may send a pilot signal to the mobile devices; a mobile device may measure a CQI value, e.g., a Carrier-to-Interference-ratio (C/I), of the communication sub-channels based on the pilot signal; the mobile device may transmit to the BS a CQI feedback corresponding to the CQI values; the BS may prioritize the mobile devices based on the CQI feedback; and/or the BS may transmit data to the prioritized mobile devices.

According to a best-M CQI feedback mechanism, each mobile device transmits to the BS the best M CQI values corresponding to M sub-channels having the highest C/I. According to a CQI feedback with hierarchical sub-channel grouping mechanism, the sub-channels can be organized hierarchically, e.g., with a tree structure, such that a group of sub-channels within the same hierarchy can share the same CQI value, e.g., as long as the combined channel is flat. According to a differential/incremental CQI feedback mechanism, the mobile device transmits to the BS only a differential or incremental part of the CQI value with relation to a previous CQI value. According to a CQI data compression mechanism, the CQI values of all sub-channels may be considered as a vector of correlated data, which may be compressed, e.g., using any suitable data compression method.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The terms "plurality" and "a plurality" as used herein includes, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), One way and/or two-way radio communication systems, cellular radio-telephone communication systems, a cellular telephone, a wireless telephone, a Personal Communication Systems (PCS) device, a PDA device which incorporates a wireless communication device, a mobile or, portable Global Positioning System (GPS) device, a device which incorporates a GPS receiver or transceiver or chip, a device which incorporates an RFID element or chip, a Multiple Input Multiple Output (MIMO) transceiver or device, a wired or wireless handheld device (e.g., BlackBerry, Palm Treo), a Wireless Application Protocol (WAP) device, or the like. Types of WLAN and/or WMAN communication systems intended to be within the scope of the present invention include, although are not limited to, WLAN and/or WMAN communication systems as described by "IEEE-Std 80216, 2004 Edition, Air Interface for Fixed Broadband Wireless Access Systems" standard ("the 802.16 standard"), and more particularly in "IEEE-Std 802.16e, 2005 Edition, Physical and Medium Access Control Layers for Combined Fixed and Mobile Operation in Licensed Bands", "IEEE-Std 802.16m, Air Interface for Fixed Broadband Wireless Access Systems—Advanced Air Interface", and the like, and/or future versions and/or derivatives and/or Long Term Evolution (LTE) of the above standards.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth, Global Positioning System (GPS), Wi-Fi, Wi-Max, ZigBee™, WiHD, Ultra-Wideband (UWB), Global System for Mobile communication (GSM), 2G, 2.5G, 3G, 3.5G, or the like. Some embodiments may be used in various other devices, systems and/or networks.

Figure 1:
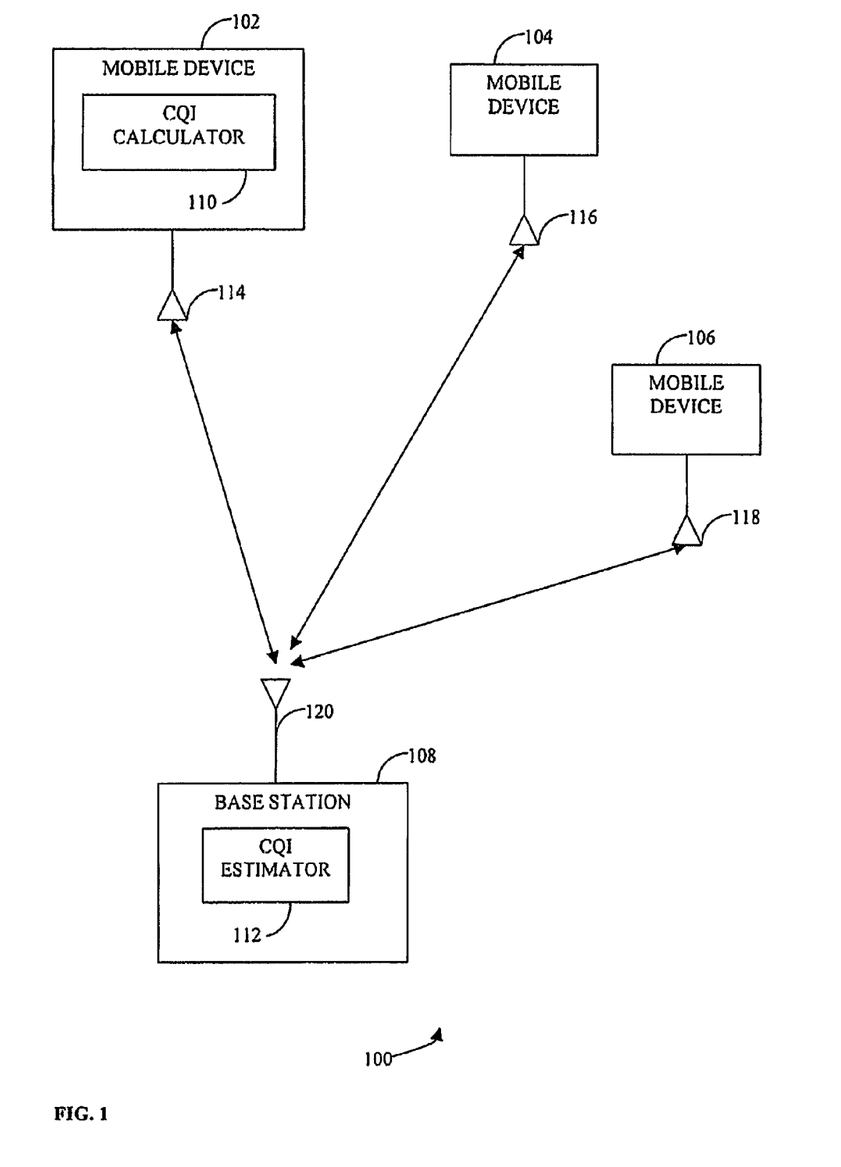
FIG. 1 is a schematic block diagram illustration of a wireless communication system in accordance with some demonstrative embodiments.

FIG. 1 schematically illustrates a block diagram of a wireless communication system 1100 in accordance with some demonstrative embodiments. System 100 may include, for example, a plurality of n mobile communication devices, egg, including mobile communication devices 102, 104 and 106 capable of communicating with a Base Station (BS) 108. Devices 102, 104 and/or 106 may be or may include, for example, a mobile phone, a cellular phone, a handheld device, a computing device, a computer, a mobile computer, a portable computer, a laptop computer, a notebook computer, a tablet computer, a network of multiple inter-connected devices, a handheld computer, a handheld device, a PDA device, a handheld PDA device, a vehicular device, a non-vehicular device, a mobile or portable device, or the like. Devices 102, 104, and/or 106 may include one or more antennas 114, 116, and/or 118, respectively; and/or base station 108 may include one or more antennas 120. Although embodiments of the invention are not limited in this respect, types of antennae that may be used for antennas 114, 116, 118 and/or 120 may include but are not limited to internal antenna, dipole antenna, omni-directional antenna, a monopole antenna, an end fed antenna, a circularly polarized antenna, a micro-strip antenna, a diversity antenna and the like.

In some demonstrative embodiments, the n mobile devices of system 100 may use a plurality of communication sub-channels to communicate with BS 108. In one example, devices 102, 104 and/or 106 may be capable of communicating with BS 108 using thirty-two communication sub-channels.

In some demonstrative embodiments, at least one mobile communication device of devices 102, 104 and 106 may transmit to base station 108 at least one Channel-Quality-Indicator (CQI) message including a subset of a plurality of CQI values corresponding to the plurality of sub-channels associated with the mobile communication device. The subset of CQI values may include first and second extreme CQI values corresponding to first and second sub-channels of the plurality of sub-channels. In some demonstrative embodiments, at least one of devices 102, 104 and 106 may include a CQI calculator 110 to determine the subset of CQI values, e.g., as described in detail below.

In some demonstrative embodiments, CQI calculator 110 may determine a plurality of CQI values corresponding to the plurality of communication sub-channels associated with device 112. In one example, one or more of the CQI values may include Carrier-to-Interference-ratio (C/I) values, and/or any other suitable type of CQI values. For example, CQI calculator 110 may determine the plurality of CQI values by determining C/I values corresponding to the plurality of sub-channels based, for example, on a pilot signal received from BS 108.

In some demonstrative embodiments, CQI calculator 110 may detect at least first and second extreme CQI values corresponding to first and second sub-channels of the plurality of sub-channels. In some demonstrative embodiments, the first and second extreme CQI values may include a maximal CQI value, denoted $CQI_{MAX}$, of the plurality of CQI values ("the maximal CQI value"), and a minimal CQI value, denoted $CQI_{MIN}$, of the plurality of CQI values ("the minimal CQI value"), respectively.

Although embodiments of the invention are not limited in this respect, in some demonstrative embodiments the subset of CQI values may include no more than three CQI values of the plurality of CQI values. In one example, the subset of CQI values may include only two CQI values of the plurality of CQI values. For example, the subset of CQI values may include only the first and second extreme CQI values. For example, the subset of CQI values may include only the minimal and maximal CQI values.

In one example, the plurality of CQI values may include thirty-two CQI values corresponding to thirty-two communication sub-channels associated with mobile device 102. For example, CQI calculator 110 may determine thirty-two CQI values, e.g., C/I values, corresponding to the thirty-two sub-channels, respectively, e.g., based on the pilot signal received from BS 108. CQI calculator 110 may detect the maximal and minimal CQI values from the thirty-two CQI values. Mobile device 102 may transmit to BS 102 a CQI message including the maximal and minimal CQI values, and an indication of first and second sub-channels, denoted $L_{MAX}$ and $L_{MIN}$, respectively, corresponding to the maximal and minimal CQI values, e.g., as described below.

Figure 2:
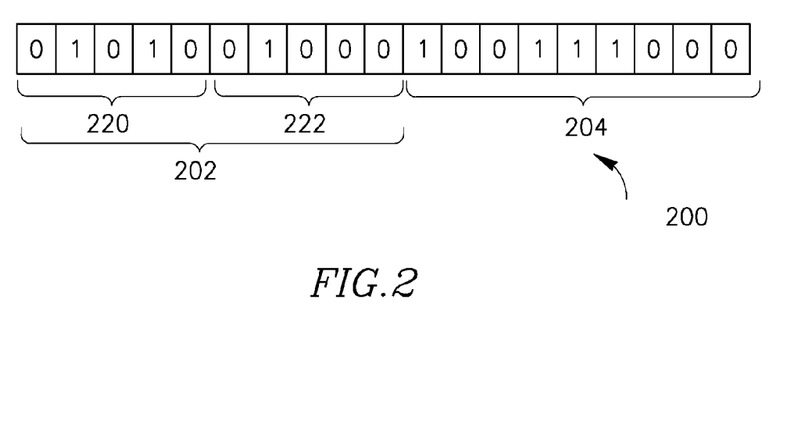
FIG. 2 is a schematic illustration of a Channel-Quality-Indication (CQI) message in accordance with some demonstrative embodiments.

The CQI message may include any suitable message format. Reference is also made to FIG. 2, which schematically illustrates a CQI message 200 in accordance with some demonstrative embodiments. Although embodiments of the invention are not limited in this respect, in some demonstrative embodiments CQI message 200 may be transmitted, for example, from mobile device 102 to BS 108.

In some demonstrative embodiments, CQI message 200 may include, for example, nineteen bits representing CQI information 202 relating to the subset of CQI values, and sub-channel information 204 indicating the communication channels corresponding to the subset of CQI values. CQI information 202 may include, for example, ten bits; and sub-channel information 204 may include, for example, nine bits, e.g., if the plurality of sub-channels includes thirty-two sub-channels. In other embodiments CQI information 202 and/or sub-channel information 204 may include any suitable format and/or number of bits.

In some demonstrative embodiments, CQI information 202 may include five bits 220 corresponding to one of the values $CQI_{MAX}$ and $CQI_{MIN}$, and five bits 222 corresponding to another of the values $CQI_{MAX}$ and $CQI_{MIN}$. The values of $CQI_{MAX}$ and $CQI_{MIN}$ may be determined, for example, by comparing a value, denoted $V_{220}$, of bits 220 to a value, denoted $V_{222}$, of bits 222. Bits 220 may correspond to $CQI_{MAX}$ and bits 222 may correspond to $CQI_{MAX}$ if, for example, $V_{220} \geq V_{222}$; or bits 220 may correspond to $CQI_{MIN}$ and bits 222 may correspond to $CQI_{MAX}$ if, for example, $V_{220} < V_{222}$.

In some demonstrative embodiments, information 204 may include an indication of the sub-channels $L_{MAX}$ and $L_{MIN}$ corresponding to the values $CQI_{MAX}$ and $CQI_{MIN}$, respectively. For example, the nine-bit value of information 204 may indicate two out of the thirty-two sub-channels, e.g., without ordering Any suitable algorithm and/or method, e.g., a varying-radix numeration method, may be implemented to determine the nine-bit value of reference information 204 corresponding to the sub-channels $L_{MAX}$ and $L_{MIN}$. The ordering of the values corresponding to sub-channels $L_{MAX}$ and $L_{MIN}$ may be determined, for example, based on the values $V_{220}$ and $V_{222}$. For example, the sub-channel $L_{MAX}$ may be located behind the sub-channel $L_{MIN}$ if, for example, $V_{220} \geq V_{222}$; or the sub-channel $L_{MAX}$ may be located ahead of the sub-channel $L_{MIN}$ if, for example, $V_{220} < V_{222}$.

As shown in FIG. 2, in one non-limiting example bits 220 may indicate the binary value 01010, bits 222 may indicate the binary value 01000, and information 204 may include the sequence "100111000", Accordingly, $CQI_{MAX}$=01010, and $CQI_{MIN}$=01000 since $V_{220} \geq V_{222}$. Additionally, from information 204 the values of sub-channels $L_{MAX}$ and $L_{MIN}$ may be determined, e.g., by applying a suitable varying-radix numeration method.

Referring back to FIG. 1, according to some demonstrative embodiments BS 108 may be capable of receiving n CQI messages from the n mobile devices, respectively; and prioritizing transmissions to the n mobile devices based on the n CQI messages, e.g., as described below.

In some demonstrative embodiments, a CQI message received from an N-th mobile device, N=1 . . . n, of the n mobile devices may include maximal and minimal CQI values, denoted $CQI_{MAX,N}$ and $CQI_{MIN,N}$, respectively corresponding to first and second sub-channels, denoted $L_{MAX,N}$ and $L_{MIN,N}$, respectively.

Figure 3:
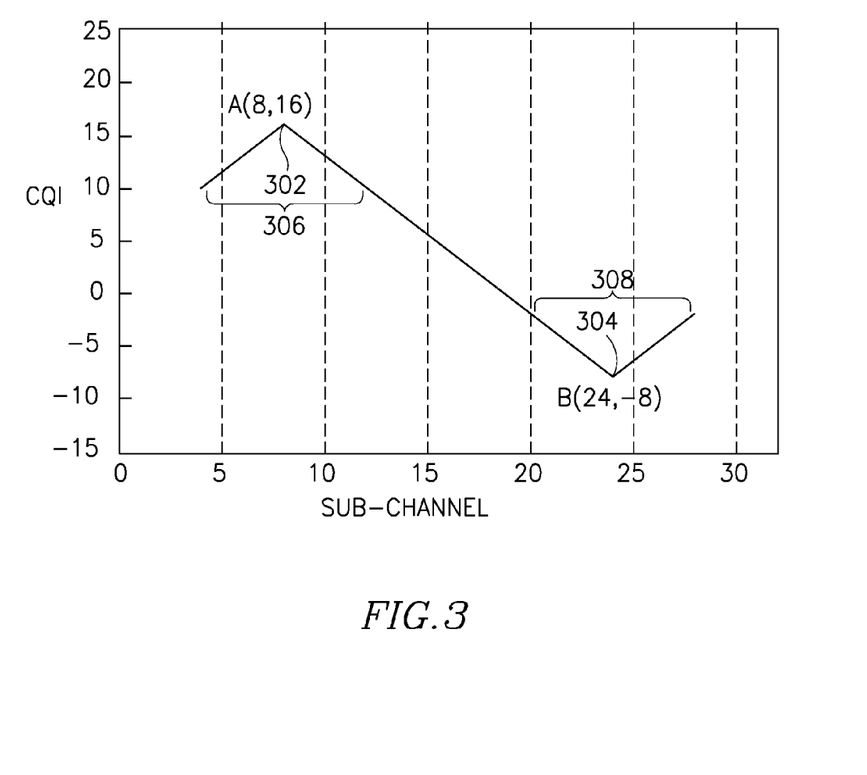
FIG. 3 is a schematic illustration of first and second confidence intervals assigned to first and second CQI values, respectively, in accordance with some demonstrative embodiments.

In some demonstrative embodiments, CQI estimator 112 may determine for at least one of the n mobile devices first and second confidence-intervals corresponding to the values $CQI_{MAX,N}$ and $CQI_{MIN,N}$; respectively; and based on the confidence intervals determine one or more CQI values, e.g., other than the values $CQI_{MAX,N}$ and $CQI_{MIN,N}$; corresponding to one or more respective sub-channels, egg, as described below FIG. 3 schematically illustrates a first confidence interval 306 assigned to a maximal CQI value 302, and a second confidence interval 308 assigned to a minimal CQI value 304, in accordance with some demonstrative embodiments.

In some demonstrative embodiments, CQI estimator 112 may determine a reliability value, denoted $T_{i,N}$, of an i-th sub-channel of the plurality of sub-channels, e.g., i=1.32, associated with the N-th mobile device, for example, based on the values $CQI_{MAX,N}$, $CQI_{MIN,N}$, $L_{MAX,N}$ and/or $L_{MIN,N}$, e.g., as described below.

In some demonstrative embodiments, a distance, denoted $L_{DT,N}$, between the sub-channels $L_{MAX,N}$ and $L_{MIN,N}$ may be determined as follows:

$$L_{DT,N} = abs(L_{MAX,N} - L_{MIN,N}) \quad (1)$$

A predicted slope, denoted $R_{SYS,N}$, of a line connecting the CQI values $CQI_{MAX,N}$ and $CQI_{MIN,N}$ may be determined, for example, as follows:

$$R_{SYS,N} = (CQI_{MAX,N} - CQI_{MIN,N})/L_{DT,N} \quad (2)$$

A slope reliability value, denoted $C_{TRST,N}$, may be defined as follows:

$$C_{TRST,N} = 2/L_{DT,N} \quad (3)$$

The reliability value $T_{i,N}$ may be determined, for example, as follows:

$$\text{if } abs(i - L_{MAX,N}) \leq \frac{L_{DT,N}}{2} \quad (4)$$
$$\text{then } T_{i,N} = 1 - abs(i - L_{MAX,N}) \times C_{TRST,N};$$
$$\text{if } abs(i - L_{MIN,N}) \leq \frac{L_{DT,N}}{2}$$
$$\text{then } T_{i,N} = 1 - abs(i - L_{MIN,N}) \times C_{TRST,N};$$
$$\text{otherwise } T_{i,N} = T_{MIN,N};$$

wherein $T_{MIN,N}$ denotes a predefined minimum reliability threshold, for example, $T_{MIN,N}$=0.1.

In some demonstrative embodiments, CQI estimator 112 may also determine a temporary predicted CQI value, denoted $CQI_{APRX,N}(i)$, corresponding to the i-th sub-channel, for example, as follows:

$$\text{if } abs(i - L_{MAX,N}) \leq \frac{L_{DT,N}}{2} \quad (5)$$
$$\text{then } CQI_{APRX,N}(i) = CQI_{MAX,N} - abs(i - L_{MAX,N}) \times R_{SYS,N};$$
$$\text{if } abs(i - L_{MIN,N}) \leq \frac{L_{DT,N}}{2}$$
$$\text{then } CQI_{APRX,N}(i) = CQI_{MIN,N} + abs(i - L_{MIN,N}) \times R_{SYS,N};$$
$$\text{otherwise } CQI_{APRX,N}(i) = (CQI_{MAX,N} + CQI_{MIN,N})/2;$$

In some demonstrative embodiments, CQI estimator 112 may also determine a historically predicted CQI value, denoted $CQI_{HSTY,N}(t,i)$, of sub-channel i of mobile device N at a time t, based on the values of $T_{i,N}$ and $CQI_{APRX,N}(i)$, e.g., as follows:

$$CQI_{HSTY,N}(t,i) = T_{i,N} \times CQI_{APRX,N}(i) + (1-T_{i,N}) \times CQI_{HSTY,N}(t-1,i) \quad (6)$$

wherein $C_{QIHYST,N}(0,i)$ denotes a predefined initial value of $C_{QIHYST,N}(t,i)$, which may be assigned with any suitable value, for example, zero.

In some demonstrative embodiments, CQI estimator 112 may use Equations 1, 2, 3, 4, 5 and/or 6 to determine the values of $C_{QIHYST,N}(t,i)$, for one or more sub-channels of one or more of the n mobile devices of system 100, based, for example, on the minimal and maximal CQI values of the CQI messages received from the one or more mobile devices.

In some demonstrative embodiments, CQI estimator 112 may determine the CQI value of a sub-channel of a mobile device based on previous CQI values of the sub-channel, and minimal and maximal CQI values of the mobile device, eggs, as described above with reference to Equations 1, 2, 3, 4, 5 and/or 6.

The following table includes overhead-related values corresponding to four CQI feedback mechanisms, denoted A, B, C, and D, respectively; and to a feedback mechanism, denoted E, including the extreme CQI values, as described herein,

TABLE 1

| | | | Sub-bands = 32 | |
| --- | --- | --- | --- | --- |
| | Mechanism | General expression | Signaling bits | CQI transmission once per radio frame |
| A | All sub-channels CQI feedback | 5 × n | 160 bit | 16 Kbps |
| B | Best-M individual | $5 \times M + \log_2\binom{n}{M} + 5$ | 48 bit | 4.8 Kbps |

TABLE 1-continued

| | | Sub-bands = 32 | | |
| Mechanism | General expression | Signaling bits | CQI transmission once per radio frame |
|---|---|---|---|
| C   DCT-P (P = 5) | 6P | 30 bit | 3 Kbps |
| D   Bitmap | 5 + n | 37 bit | 3.7 Kbps |
| E   Extreme CQI values | $10 + \log_2\left(\binom{2}{32}\right)$ | 19 bit | 1.9 Kbps |

As shown in Table 1, a CQI message according to CQI feedback mechanism E may include, for example, nineteen bits, while CQI feedback mechanisms A, B, C, and D may require a relatively large number of signaling bits. As also shown In Table 1, the transmission of the CQI message according to CQI feedback mechanism E may require, for example, 1.9 Kilo bits per second (Kbps), while mechanisms A, B, C, and D may require 16, 4.8, 3, and 3.7 Kbps, respectively, for performing the CQI feedback.

In some demonstrative embodiments, BS 108 may avoid assigning to the N-th mobile device a communication channel corresponding to the minimal CQI value $CQI_{MIN,N}$.

Figure 4:
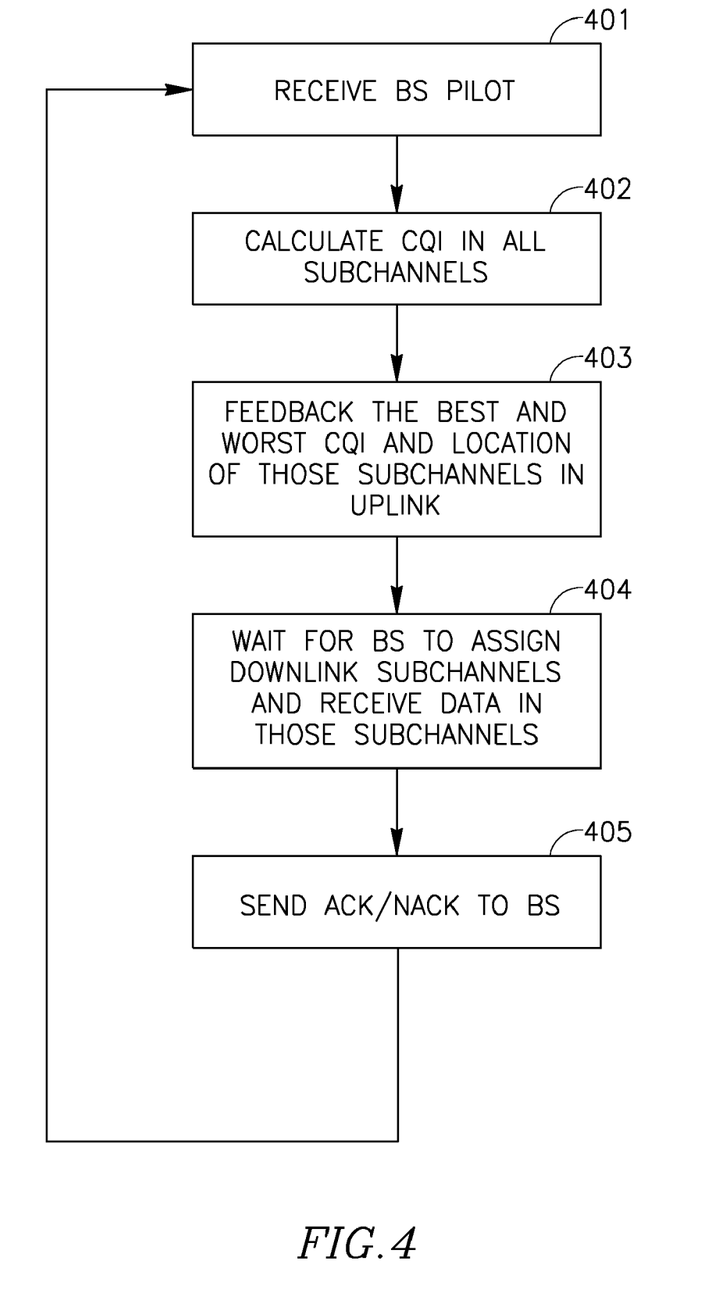
FIG. 4 is a schematic flow-chart illustration of a method of CQI feedback from a mobile communication device to a BS in accordance with some demonstrative embodiments.

Reference is now made to FIG. 4, which schematically illustrates a method of CQI feedback from a mobile communication device to a BS in accordance with some demonstrative embodiments. Although embodiments of the invention are not limited in this respect, one or more operation of the method of FIG. 4 may be implemented by mobile devices 102, 104 and/or 106 (FIG. 1) to communicate with BS 108 (FIG. 1).

As indicated at block 401, the method may include receiving at the mobile device a pilot signal from the BS. For example, device 102 (FIG. 1) may receive a pilot signal from BS 108 (FIG. 1).

As indicated at block 402, the method may include calculating a plurality of CQI values corresponding to a plurality of sub-channels associated with the mobile device. For example, CQI calculator 110 (FIG. 1) may calculate a plurality of CQI values, e.g., thirty two CQI values, corresponding to a plurality of sub-channels used by mobile device 102 (FIG. 1), e.g., thirty two sub-channels, respectively.

As indicated at block 403, the method may include transmitting a CQI message from the mobile device to the BS, wherein the CQI message includes a subset of the plurality of CQI values. For example, mobile device 102 (FIG. 1) may transmit to BS 108 (FIG. 1) a CQI message including the values $CQI_{MIN}$, $CQI_{MAX}$, $L_{MIN}$, and $L_{MAX}$, e.g., as described above.

As indicated at bock 404, the method may include receiving transmissions from the BS via sub-channels assigned by BS. For example, BS 108 (FIG. 1) may assign one or more sub-channels to communication with mobile device 102 (FIG. 1), e.g., as described below with reference to FIG. 5.

As indicated at block 405, the method may also include, acknowledging to the BS communications received from the BS. For example, mobile device 102 (FIG. 1) may send BS 108 an acknowledge message (ACK) or a non-acknowledge (NACK) message to BS 108 (FIG. 1).

Figure 5:
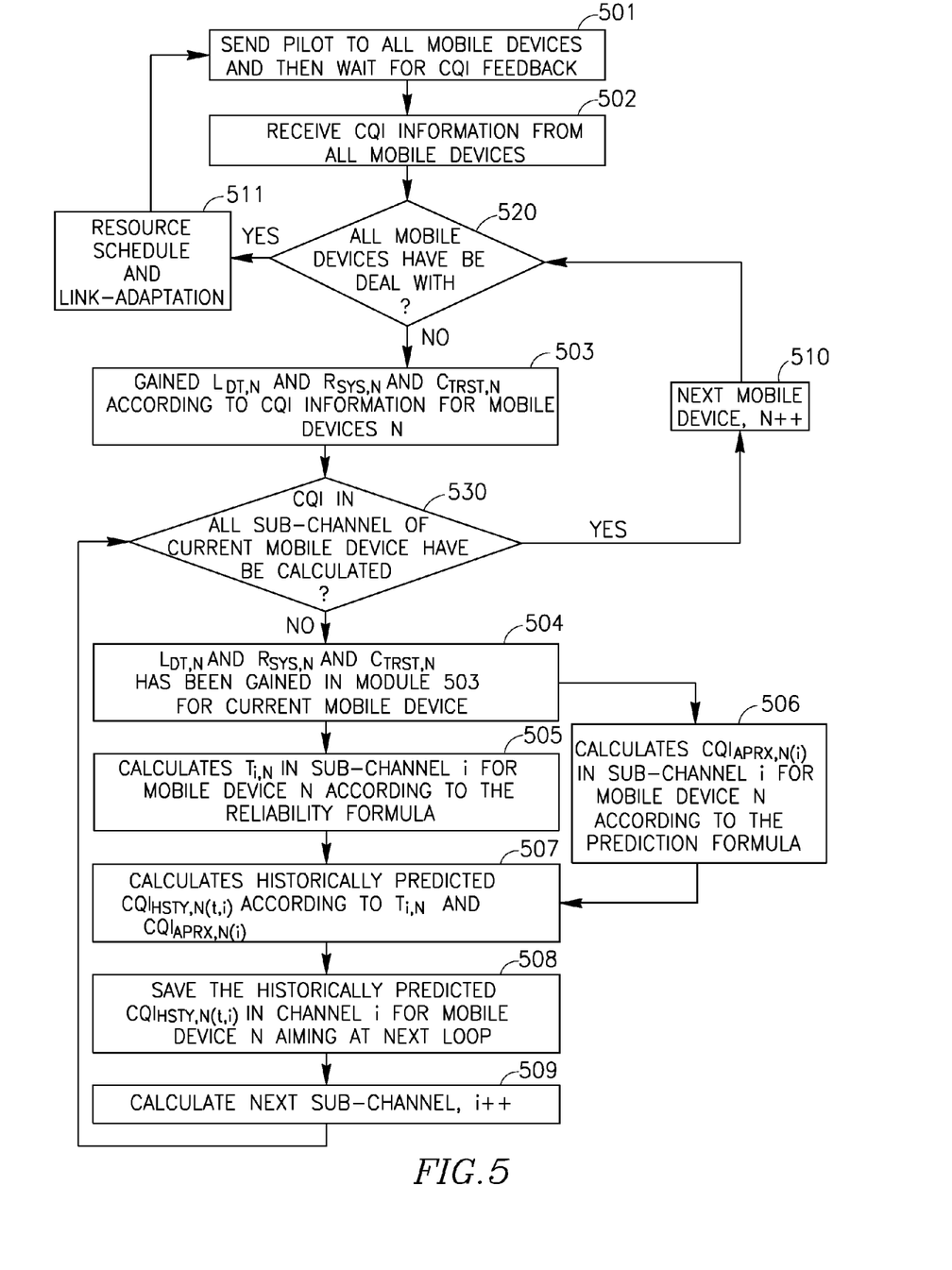
FIG. 5 is a schematic flow-chart illustration of a method of assigning one or more communication sub-channels to one or more mobile devices in accordance with some demonstrative embodiments.

Reference is now made to FIG. 5, which schematically illustrates a method of assigning one or more communication sub-channels to one or more mobile devices in accordance with some demonstrative embodiments. Although embodiments of the invention are not limited in this respect, one or more operation of the method of FIG. 5 may be implemented by BS 108 (FIG. 1) to communicate with mobile devices 102, 104 and/or 106 (FIG. 1).

As indicated at block 501, the method may include transmitting a pilot signal from the BS to the plurality of mobile devices. For example, BS 108 (FIG. 1) may transmit a pilot signal to mobile devices 102, 104 and 106 (FIG. 1).

As indicated at block 502, the method may include receiving a plurality of CQI messages from the plurality of mobile devices, respectively. The CQI message received from a mobile device may include the minimal and maximal CQI values, and first and second sub-channels corresponding to the minimal and maximal CQI values CQI values, respectively.

As indicated at block 503, the method may include determining the values $L_{DT,N}$, $R_{SYS,N}$ and/or $C_{TRST,N}$ corresponding to the N-th mobile device of the plurality of mobile devices, based on the CQI message received from the N-th mobile device, e.g., as described above.

As indicated at block 505, the method may include determining the value $T_{i,N}$ corresponding to the sub-channel i of mobile device N, e.g., as described above.

As indicated at block 506, the method may include BS determining the value $CQI_{APRX,N}(i)$ corresponding to the sub-channel i of mobile device N, e.g., as described above.

As indicated at block 507, the method may include determining the value $CQI_{HSTY,N}(t,i)$ based on the values $T_{i,N}$ and $CQI_{APRX,N}(i)$, e.g., as described above.

As indicated at block 508, the method may also include saving the value $CQI_{HSTY,N}(t,i)$. For example, BS 108 (FIG. 1) may store the value of $CQI_{HSTY,N}(t,i)$ e.g., within a memory (not shown) associated with BS 108 (FIG. 1).

As indicated at block 509, the method may include determining a next sub-channel of the mobile device N to be handled.

As indicated at block 530, the method may include repeating the operations of blocks 505, 506, 507, and 508 with respect to the next sub-channel.

As indicated at block 510, the method may include determining a next mobile device to be handled. As indicted at block 520, the method may include repeating the operations of blocks 503, 530, 505, 506, 507, 508 and 509, with respect to the next mobile device.

As indicated at block 511, the method may include prioritizing transmissions, e.g., by scheduling resources and/or performing link-adaptation, to the plurality of mobile devices based on the determined CQI values of the sub-channels of the plurality of mobile devices.

Other suitable operations may be used, and other suitable orders of operation may be used.

Some embodiments of the, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a RAM, a ROM, a rigid magnetic disk, and an optical disk. Some demonstrative examples of optical disks include CD-ROM, CD-R/W, and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order, to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   receiving a channel-quality-indicator message from a mobile communication device to a base station, said channel-quality-indicator message including only a maximal channel-quality-indicator value and a minimal channel-quality-indicator value of three or more channel-quality-indicator values corresponding to first and second respective sub-channels of three or more sub-channels associated with said mobile communication device;
   determining at least one reliability value corresponding to at least one other sub-channel of said three or more sub-channels, respectively, based on a distance between said other sub-channel and at least one of said first and second sub-channels; and
   determining a predicted channel-quality-indicator value corresponding to said other sub-channel based on said reliability value and said maximal and minimal channel-quality-indicator values.

2. The method of claim 1 comprising:
   calculating said three or more channel-quality-indicator values based on a pilot signal received from said base station; and
   detecting said maximal and minimal channel-quality-indicator values from said three or more channel-quality-indicator values.

3. The method of claim 1 comprising:
   receiving at said base station a plurality of channel-quality-indicator messages including said channel-quality-indicator message from a plurality of mobile communication devices including said mobile communication device, respectively; and
   prioritizing transmissions to said plurality of mobile communication devices based on said plurality of channel-quality-indicator messages.

4. The method of claim 1 comprising determining said predicted channel-quality-indicator value based on one or more previous channel-quality-indicator values corresponding to said other sub-channel.

5. The method of claim 1 comprising:
   determining a temporary channel-quality-indicator value based on said maximal and minimal channel-quality-indicator values; and
   determining said predicted channel-quality-indicator value based on a combination of said temporary channel-quality-indicator value and said reliability value.

6. The method of claim 1, wherein receiving said channel-quality-indicator message comprises receiving a message including ten bits representing said maximal and minimal channel-quality-indicator values, and nine bits representing said first and second sub-channels.

7. A base-station capable of receiving a plurality of channel-quality-indicator messages from a plurality of mobile communication devices, respectively; and prioritizing transmissions to said plurality of mobile devices based on said plurality of channel-quality-indicator messages,
   wherein at least one channel-quality-indicator message of said plurality of channel-quality-indicator messages includes only a maximal channel-quality-indicator value and a minimal channel-quality-indicator value corresponding to first and second respective sub-channels, associated with a mobile communication device of said plurality of mobile communication devices,
   wherein the base station is to determine at least one predicted channel-quality-indicator values corresponding to at least one other sub-channels associated with said mobile communication device, based on said maximal and minimal channel-quality-indicator values and one or more previous channel-quality-indicator values corresponding to said other sub-channel, wherein said base-station is to determine a reliability value corresponding to said other sub-channel based on a distance between said other sub-channel and at least one of said first and second sub-channels, and to determine said predicted channel-quality-indicator value based on said reliability value.

8. The base station of claim 7, wherein said base-station is capable of determining a temporary channel-quality-indicator value based on said maximal and minimal channel-quality-indicator values; and determining said predicted channel-quality-indicator value based on a combination of said temporary channel-quality-indicator value and said reliability value.

9. The base-station of claim 7, wherein said maximal and minimal channel-quality-indicator values are based on a pilot signal from said base station.

10. The base-station of claim 7, wherein said channel-quality-indicator message comprises ten bits representing said maximal and minimal channel-quality-indicator values, and nine bits representing said first and second sub-channels.

11. A system comprising:
a mobile communication device to calculate three or more channel-quality-indicator values corresponding to three or more sub-channels associated with the mobile communication device;
to transmit a channel-quality-indicator message to a base station, said channel-quality-indicator message including only a first channel-quality-indicator value and a second channel-quality-indicator value of said three or more channel-quality-indicator values corresponding to first and second respective sub-channels of said three or more sub-channels; and
to receive from the base station at least one wireless communication transmission over at least one sub-channel of said three or more sub-channels, which is assigned to the mobile communication device based on said channel-quality-indicator message,
wherein the at least one sub-channel is assigned to the mobile communication device based on at least one predicted channel-quality-indicator value corresponding to at least one other sub-channel of said three or more sub-channels, wherein the predicted channel-quality-indicator value is based on said first and second channel-quality-indicator values, one or more previous channel-quality-indicator values corresponding to said other sub-channel, and a distance between said other sub-channel and at least one of said first and second sub-channels.

12. The system of claim 11, wherein the mobile communication device is to calculate said three or more channel-quality-indicator values based on a pilot signal received from said base station; and
to detect said first and second channel-quality-indicator values from said three or more channel-quality-indicator values.

13. The system of claim 11, wherein the at least one wireless communication transmission is prioritized based on said channel-quality-indicator message.

14. The system of claim 11, wherein said first and second channel-quality-indicator values include a maximal channel-quality-indicator value and a minimal channel-quality-indicator value of said three or more channel-quality-indicator values.

15. The system of claim 11, wherein said channel-quality-indicator message comprises ten bits representing said first and second channel-quality-indicator values, and nine bits representing said first and second sub-channels.

* * * * *

UNITED STATES PATENT AND TRADEMARK OFFICE
CERTIFICATE OF CORRECTION

| | |
|---|---|
| PATENT NO. | : 7,974,242 B2 |
| APPLICATION NO. | : 11/923781 |
| DATED | : July 5, 2011 |
| INVENTOR(S) | : Rongzhen Yang et al. |

It is certified that error appears in the above-identified patent and that said Letters Patent is hereby corrected as shown below:

In column 10, line 53, in Claim 7, delete "values" and insert -- value --, therefor.

In column 10, line 54, in Claim 7, delete "channels" and insert -- channel --, therefor.

Signed and Sealed this
Twenty-second Day of November, 2011

David J. Kappos
*Director of the United States Patent and Trademark Office*